United States Patent
Lanzara et al.

(10) Patent No.: US 8,142,754 B2
(45) Date of Patent: Mar. 27, 2012

(54) METHOD FOR SYNTHESIS OF HIGH QUALITY GRAPHENE

(75) Inventors: Alessandra Lanzara, Piedmont, CA (US); Andreas K. Schmid, Berkeley, CA (US); Xiaozhu Yu, Berkeley, CA (US); Choonkyu Hwang, Albany, CA (US); Annemarie Kohl, Beneditkbeuern (DE); Chris M. Jozwiak, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/043,329

(22) Filed: Mar. 8, 2011

(65) Prior Publication Data

US 2011/0223094 A1    Sep. 15, 2011

Related U.S. Application Data

(60) Provisional application No. 61/313,214, filed on Mar. 12, 2010.

(51) Int. Cl.
*B01J 19/08* (2006.01)

(52) U.S. Cl. ............... 423/445 R; 423/447.2; 423/448; 977/744

(58) Field of Classification Search .......... 423/445 R, 423/447.2, 448; 977/744
See application file for complete search history.

(56) References Cited

OTHER PUBLICATIONS

Wallace, "The Band Theory of Graphite", Physical Review Letters, vol. 71, No, 9, pp. 622-634, (May 1, 1947).
Slonczewski et al., "Band Structure of Graphite", Physical Review Letters, vol. 109, No. 2, pp. 272-279, (Jan. 15, 1958).
Morozov et al., "Giant Intrinsic Carrier Mobilities in Graphene and Its Bilayer", Physical Review Letters, vol. 100, pp. 016602-1-016602-4, (Jan. 11, 2008).
Tromp et al. "Thermodynamics and Kinetics of Graphene Growth onSiC(0001)", Physical Review Letters, vol. 102, pp. 106104-1-106104-4, (Mar. 13, 2009).
Ohta et al., "Interlayer Interaction and Electronic Screening in Multilayer Graphene Investigated with Angle-Resolved Photoemission Spectroscopy", Physical Review Letters, vol. 98, pp. 206802-1-206802-4, (May 18, 2007).
Hupalo et al., "Growth mechanism for exitaxial grahene on vicinal 6H-Sic(0001) surfaces: A scanning tunneling microscopy study", Physical Review Letters B, vol. 80, pp. 041401-1-041401-4, (Jul. 7, 2009).
Virojanadara et al., "Homogeneous large-area graphene layer growth on 6H-SiC(001)", Physical Review Letters B, vol. 78, pp. 245403-1-245403-6, (Dec. 1, 2008).
Hannon et al., "Pit formation during graphene synthesis on SiC(001): In Situ electron microscopy", Physical Review Letters B, vol. 77, pp. 241404-1-241404-4, (Jun. 26, 2008).

(Continued)

*Primary Examiner* — Stuart Hendrickson
*Assistant Examiner* — Richard M Rump
(74) *Attorney, Agent, or Firm* — Leonard T. Guzman; Lawrence Berkeley National Laboratory

(57) ABSTRACT

A method is described herein for the providing of high quality graphene layers on silicon carbide wafers in a thermal process. With two wafers facing each other in close proximity, in a first vacuum heating stage, while maintained at a vacuum of around $10^{-6}$ Torr, the wafer temperature is raised to about 1500° C., whereby silicon evaporates from the wafer leaving a carbon rich surface, the evaporated silicon trapped in the gap between the wafers, such that the higher vapor pressure of silicon above each of the wafers suppresses further silicon evaporation. As the temperature of the wafers is raised to about 1530° C. or more, the carbon atoms self assemble themselves into graphene.

9 Claims, 5 Drawing Sheets

OTHER PUBLICATIONS

Novoselov et al., "Electric Field Effect in Atomically Thin Carbon Films", Science, vol. 306, pp. 666-669, (Oct. 22, 2004).

Novoselov et al., "Room-Temperature Quantum Hall Effect in Graphene", Science, vol. 315, pp. 1379, (Mar. 9, 2007).

Bostwick et al., "Quasiparticle dynamics in graphene", Nature Physics, vol. 3, pp. 36-40, (Jan. 2007).

Geim et al., "The rise of graphene", Nature Materials, vol. 6, pp. 183-191, (Mar. 2007).

Kim et al., "Large-scale pattern growth of graphene films for stretchable transparent electrodes", Nature, vol. 457, pp. 706-710, (Feb. 5, 2009).

Schedin et al., "Detection of individual gas molecules adsorbed on graphene", Nature Materials, vol. 6, pp. 652-655, (Sep. 2007).

Trauzettel et al., "Spin Qubits in graphene quantum dots", Nature Physics, vol. 3, pp. 192-196, (Mar. 2007).

Liu et al., "Ultraflat graphene", Nature, vol. 462, pp. 339-341, (Nov. 19, 2009).

Emtsev et al., "Towards wafer-size graphene layers by atmospheric pressure graphitization of silicon carbide", Nature Materials, vol. 8, pp. 203-207, (Mar. 2009).

Novoselov et al., "Two-dimensional gas of massless Dirac fermions in graphene", Nature, vol. 438, pp. 197-200, (Nov. 10, 2005).

Zhou et al., "Substrate-induced bandgap opening in epitaxial graphene", Nature Materials, vol. 6, pp. 770-775, (Oct. 2007).

Berger et al., "Ultrathin Epitaxial Graphite: 2D Electron Gas Properties and a Route toward Graphene-based Nanoelectronics", The Journal of Physical Chemistry B, vol. 108, pp. 19912-19916, (Oct. 7, 2004).

Rollings et al., "Synthesis and characterization of atomically thin graphite films on a silicon carbide substrate", Journal of Physics and Chemistry of Solids, vol. 67, No. 9-10, pp. 2172-2177. (Sep.-Oct. 2006).

Siegel et al., "Self-doping effects in epitaxially grown graphene", Applied Physics Letters, vol. 93, No. 24, pp. 243119-1-243119-3, (2008).

Syvajarvi et al., "Growth of 6H and 4H-SIC by sublimation epitaxy", Journal of Crystal Growth, vol. 197, No. 1-2, pp. 155-162, (Feb. 1999).

Syvajarvi et al., "Step-bunching in 6H-SIC growth by sublimation epitaxy", Journal of Physics: Condensed Matter, vol. 11, No. 49, pp. 10019-10024, (1999).

Damascelli et al., "Angel-resolved photoemission studies of the cuprate superconductors", Review of Modern Physics, vol. 75, No. 2, pp. 473-541, (Apr. 2003).

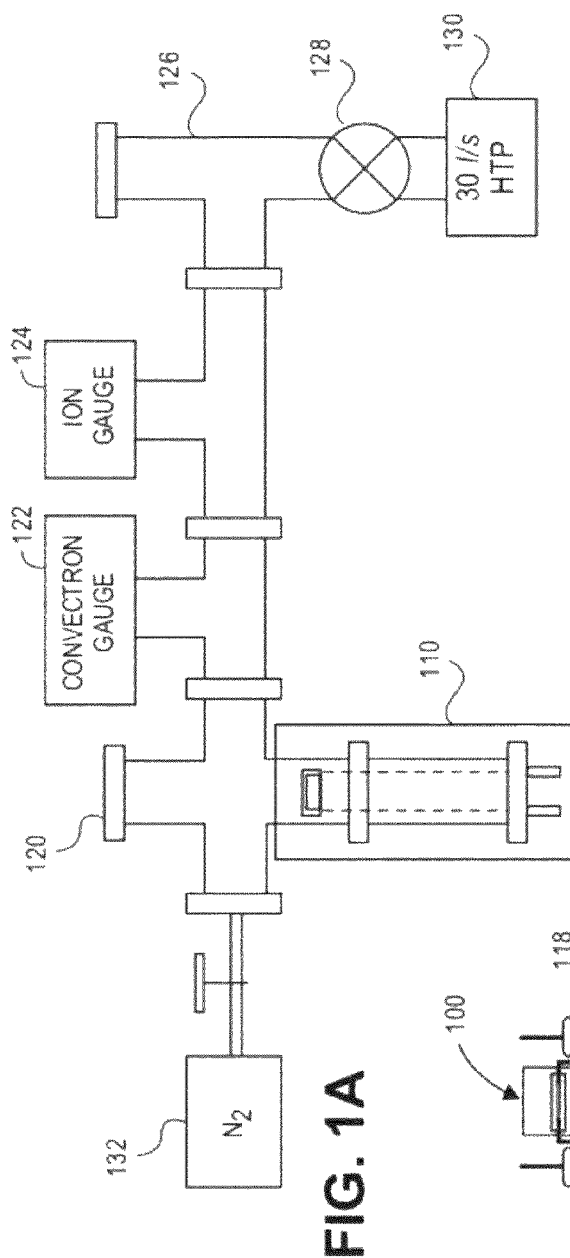
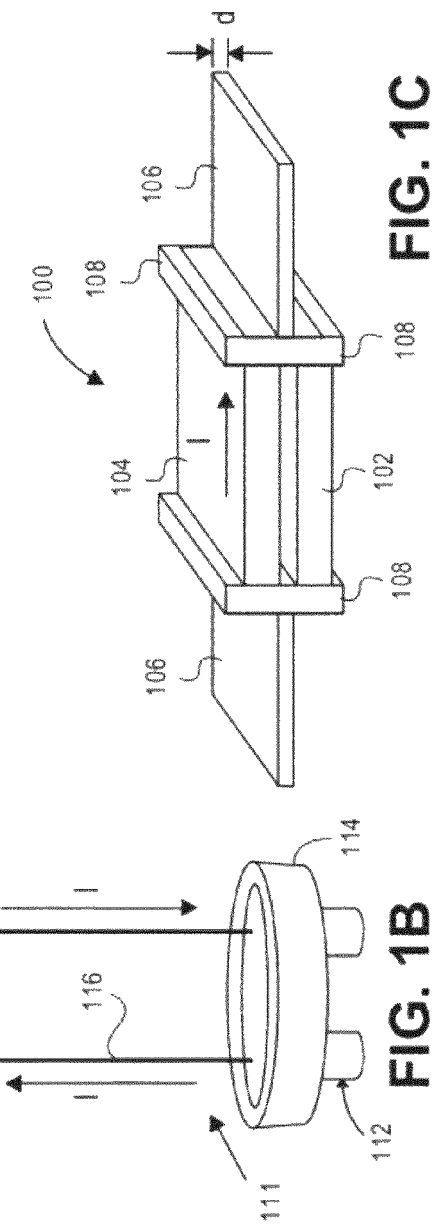
FIG. 1A
FIG. 1B
FIG. 1C

METHOD FOR SYNTHESIS OF HIGH QUALITY GRAPHENE

CROSS REFERENCE TO RELATED APPLICATIONS

This non-provisional US application claims priority to U.S. Provisional application Ser. No. 61/313,214 filed Mar. 12, 2010, and entitled Method for Synthesis of High Quality Graphene, the contents of which application incorporated herein by reference as is fully set out in its entirety.

STATEMENT OF GOVERNMENTAL SUPPORT

The invention described and claimed herein was made in part utilizing funds supplied by the U.S. Department of Energy under Contract No. DE-AC02-05CH11231 between the U.S. Department of Energy and the Regents of the University of California for the management and operation of the Lawrence Berkeley National Laboratory. The government has certain rights in this invention.

BACKGROUND OF THE INVENTION

1. Field of the Invention

This invention generally relates to a method for the production of graphene, and more specifically to an improved method for synthesizing micrometer scale graphene sheets by, in one embodiment, the simultaneous vacuum thermal decomposition of two SiC substrates placed in close, face to face proximity to each other.

2. Background Prior Art

Graphene, a two-dimensional array of carbon atoms in a honeycomb lattice, has been theoretically studied for decades in terms of the fundamental building block of carbon based materials, such as graphite and carbon nanotubes [1, 2]. However, it had not been believed to exist due to thermodynamic instability until Novoselov et al. succeeded in isolating single graphene layers from graphite by means of micromechanical cleavage in 2004 [3]. The realization of graphene has stimulated a large amount of experimental research which led to the discovery of numerous novel properties, including quantum Hall effects, and relativistic quasi particles with a group velocity of 1/300 c (where c is the speed of light) [4-6]. High values of conductance, mobility, and mechanical strength have also been observed [4, 7-8]. Based on these properties, graphene shows promising potentials for a wide variety of new technological applications [9-11], such as post-CMOS digital electronics, single-molecule gas sensors, spintronic devices, etc.

In order for graphene to be successfully applied to new devices, homogeneous growth of graphene with device-sized scale (micrometer) on a semiconducting or insulating substrate is essential. Several approaches, such as mechanical exfoliation of graphite followed by transportation onto the surface of $SiO_2$ or mica [3, 12] and epitaxial growth on an SiC substrate in vacuum [13] have been proposed to meet this goal. Although mechanical exfoliation has yielded results, large-scale production by this method is intrinsically limited. Since the first report by Berger et al. [9], epitaxial growth by thermal decomposition of SiC has been considered a viable route for fabricating large area graphene. However, poorly controlled (excessively rapid) silicon sublimation rates from SiC substrate leads to poor quality of graphene as the carbon atoms are unable to self-arrange properly before too much silicon sublimates from below. Externally applied Si supplements, such as disilane ($Si_2H_6$), has been used to compensate for the rate of Si sublimation to alleviate this problem [14, 15]. Alternatively, the sublimation rate has been slowed down by epitaxial growth under the ambient pressures of noble gas [16, 17]. Both methods allow for better annealing conditions to produce more homogenous graphene layers.

The two known methods for compensating Si sublimation during graphene growth pose technical challenges. Disilane is a pyrophoric gas (it can spontaneously burst into flame when in contact with air), requiring costly safety precautions. Graphene growth under ambient pressures of noble gases requires a sophisticated furnace. The method described here is much more easily realized than these two known methods in that (1) no hazardous materials are involved, and (2) very simple arrangements can be used for heating the SiC substrates, for example direct-current heating.

SUMMARY OF THE INVENTION

Described herein is a new method for synthesizing micrometer scale graphene sheets by simultaneous vacuum thermal decomposition of two SiC substrates, in one embodiment SiC wafers, directly facing each other with only a narrow (e.g. 25 micron) gap between them. During the initial annealing stage at 1500° C., the epitaxial quality of the SiC substrates is improved, creating atomically flat SiC with large terrace sizes. With annealing temperatures at 1530° C. or higher, the sublimation of Si prevails, which results in the formation of micrometer scale graphene sheets. The thickness of the graphene is controlled by controlling the annealing temperature and duration of heating. (These annealing parameters were determined by confirming graphene thickness grown on a series of test-samples, using angle-resolved photoemission spectroscopy (ARPES), low-energy-electron microscopy (LEEM) or other methods for thickness measurements). Atomic force microscopy (AFM) measurements demonstrate that homogeneity of graphene is notably improved by this face-to-face method compared with other, conventional methods.

This new method is straightforward and does not require sophisticated fabrication, or elaborate specifications or additional materials for the restriction of the Si sublimation rate. Thus this method may have significant potential for the efficient production of wafer size graphene, which will be essential to the development of graphene based devices.

BRIEF DESCRIPTION OF THE DRAWINGS

The foregoing aspects and others will be readily appreciated by the skilled artisan from the following description of illustrative embodiments when read in conjunction with the accompanying drawings.

FIG. 1A is a schematic view of a furnace useful for the practice of one of the methods of the instant invention. FIGS. 1B and 1C are magnified views of components within the furnace.

FIG. 3d depicts a similar SiC surface treated according to a method of the prior art, i.e., reference 13.

DETAILED DESCRIPTION

Figure 2:
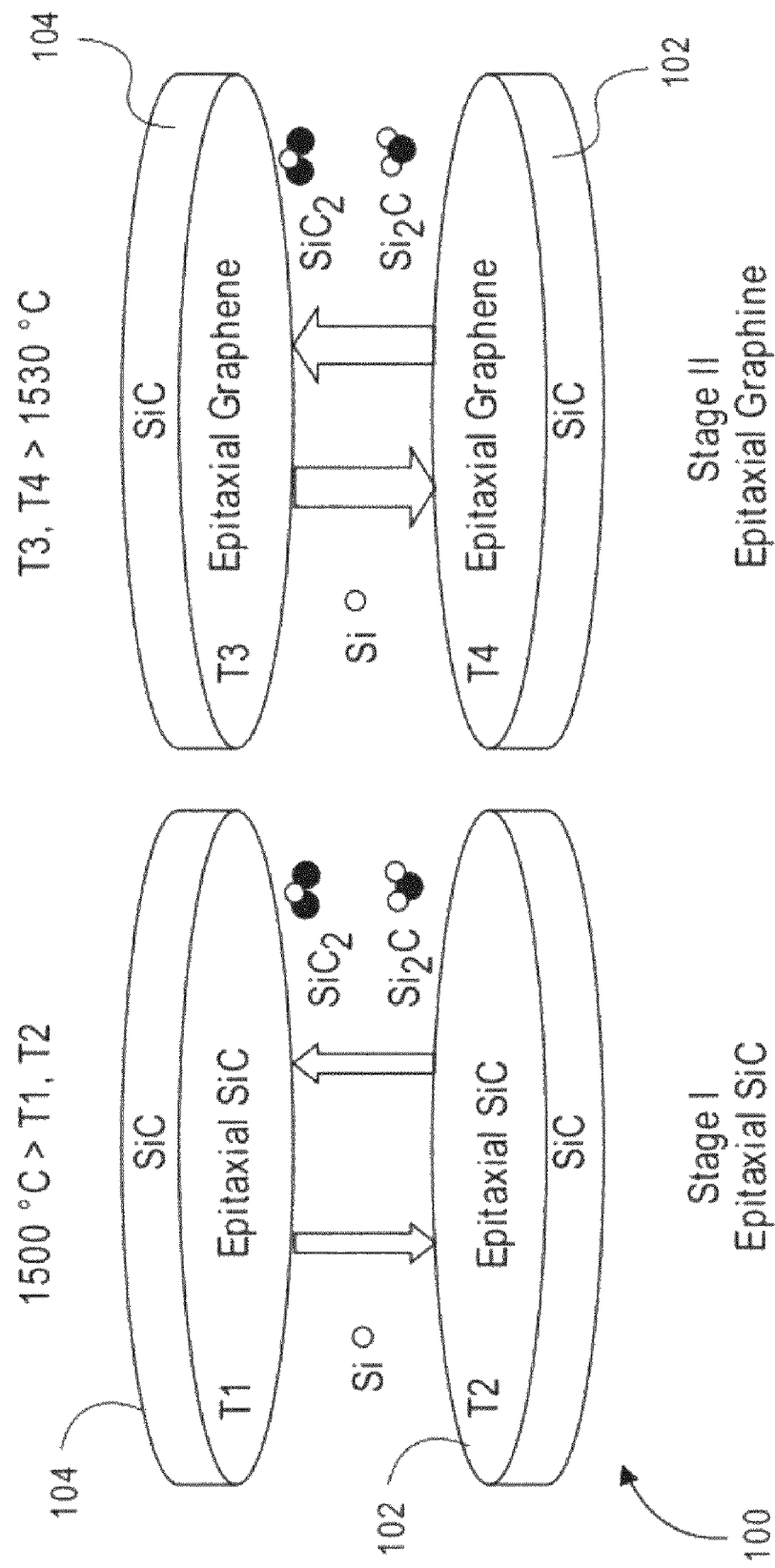
FIG. 2 is schematic of an embodiment involving the two stages of heating according to one embodiment of the invention.

Herein described is a method for the synthesis of high quality epitaxial graphene on SiC(0001) substrate following the controlled sublimation of Si. Graphene was grown using a "face-to-face" method in which two SiC substrates are placed one on top of each other with a small gap in between and are heated simultaneously. The close proximity of the two surfaces reduces the ability of the Si to escape, thus reducing the effective rate of Si sublimation during graphene growth. AFM shows that graphene grown in this way exhibits homogenous terraces with ~1 μm width and a few tens of μm length. This represents much better homogeneity than was able to be achieved previously by annealing a single piece of the SiC substrate in vacuum, where average terrace sizes of the order of 100×100 $nm^2$ [18] were found. ARPES confirms that graphene thickness, or number of layers, is controlled as a function of annealing temperature. This "face-to-face" method is straightforward, simple, and economical, yet yields high quality graphene of large length scales. The results suggest that the method has potential for efficient production of graphene based devices.

FIG. 1A is a schematic representation of a vacuum furnace 110 useful for carrying out the methods of the invention. Low furnace pressures in the order of $1\times10^{-5}$ to $1\times10^{-6}$ Torr are maintained, for example, by a 30 l/s hybrid turbo pump (HTP) 130, connected to the furnace via chamber 126, pump 130 can be isolated from furnace 110 by valve 128. In the arrangement of FIG. 1A, furnace 110, convectron gauge 122, and ion gauge 124 are all in communication with each other via chamber 126. The gauges 122 and 124 are provided to ensure that vacuum pressure remains sufficiently low (that is to about $1\times10^{-5}$ Torr or less) during processing carried out the in furnace, in order to prevent burning (an intensive chemical reaction with oxygen). Portal 120 of chamber 126 is in direct line with furnace 110 to provide a passageway for the introduction of the substrates (such as wafers) to be processed according to the methods of the invention. Finally, a source of nitrogen 132 is provided to afford a means of purging the furnace chamber and structure 126 after conducting a graphene synthesis.

With reference to FIGS. 1B and 1C, in experiments performed to demonstrate the viability of the process, two rectangular pieces of SiC 102 and 104 are shown disposed in furnace unit 110 stacked in pairs with sections of tantalum (Ta) foil 106 at the edges used to define a 25 micron gap "d" between the two inner surfaces. Tantalum is used in this process due both to its conductivity and high melting point (3017° C.). It should be appreciated that other means could be used to provide for uniform spacing. Alternatives include spacers made of other refractory metals (for example tungsten or molybdenum, both cheaper than tantalum) or spacers made of high-temperature ceramics including SiC. These spacers can also be made in a number of alternative shapes including foils, wires, or spheres.

The substrates 102 and 104 are oriented such that the Si-terminated surfaces face each other. The two ends of the stack are wrapped by "L"-shaped pieces of Ta foil 108 at each end and connected to electrode 116 via conductive clamps 118, allowing simultaneous parallel resistive heating of the samples as shown. Furnace unit 100 further includes base 114, which can be a commercially available vacuum feedthrough, and insulators 112 through which electrical connection is provided for electrodes 116.

For SiC wafers, due to the symmetry of the crystal structure, the two sides of the wafer are in fact different, and thus have several different properties and behaviors. One side is called the "Si-terminated" side and the other is called "C-terminated" side. In our experiments, the Si-terminated surface was chosen for growing graphene based on the following: (1) it is known that the silicon sublimation rate from the Si-terminated surface is slower than C-terminated surface of the SiC crystal compared at the same temperature. Hence, the Si-terminated surface provides easier control of thickness of graphene. When the wafers are purchased, it was specifically requested that the Si-terminated sides be polished. So in the growth method described here, the two wafer pieces were sandwiched so that the Si-terminated sides faced each other.

One could, of course, also have the C-terminated side polished as well, and grow graphene on these surfaces too. However, as stated above, the Si evaporation rate is higher, making it more difficult to obtain predictable and uniform thicknesses of graphene.

The simple geometry of this method results in two important effects. First, at temperatures below 1500° C., more particularly between about 1200° C. to 1500° C. (before graphene growth has begun), both pieces 102 and 104 of SiC act as sources as well as sinks of Si on the opposing surface (Stage I in FIG. 2). This type of annealing results in high quality SiC surfaces with large, atomically flat terraces. By first creating large, flat substrate terraces, the eventually formed graphene layer will have similarly large terrace sizes. Other, prior art approaches to high quality graphene growth require careful hydrogen etching of commercial SiC wafers to obtain similar large SiC terraces before graphene growth is performed.

Second, the close proximity of the two surfaces partially traps Si atoms which are sublimated from each heated surface, increasing the local partial pressure of Si vapor within the gap. The pressure of Si vapor next to the surfaces of the SiC crystals restricts the net rate of Si sublimation from the substrates (FIG. 2) and allows large pieces of graphene to be formed as described above. Thus, the same effect as in previous methods aiming to improve graphene annealing conditions by reducing Si sublimation (by introduction of argon or disilane) is achieved in a very simple manner. It is noted that as Si can escape from the gap near the edges of the pieces, control of the Si sublimation from the edge of the substrates is reduced resulting in thicker and poorer quality of graphene at the edges.

The substrates used in the experiments were cut into 4×6 $mm^2$ sizes using a diamond saw from n-type 6H-SiC(0001) single crystalline wafers (Cree, Inc. Catalog Nu. W6NRDOX-0000). The substrates were degassed at 700° C. for 4 hours followed by annealing at elevated temperatures of between 1530° C.-1700° C. As in other methods, higher temperatures result in thicker layers, or more layers of graphene. In the present method, 1530° C. results in single-layer graphene, about 1600° C. in double-layer, and 1700° C. results in triple-layer graphene. Temperature was monitored by an infrared optical pyrometer set to an emissivity of 0.96.

In these experiments the heating steps were fairly straight forward, because the heating was provided by resistive heating to the substrates. In one exemplary embodiment, the substrates were ramped from room temperature to their final temperature of 1530° C. over a few minutes (e.g. 3 minutes), then held at that temperature for approximately 20 or so minutes to produce a single-layer of graphene. In order to obtain two layers of graphene, a similar ramp was used, going from room temperature to 1600° C. in just a few minutes, with the substrates held at final temperature for another 20 minutes. Finally, to grow three layers of graphene, the substrates were heated at essentially the same ramp rate from room temperature to a final temperature of 1700° C., and held at that temperature for about 20 minutes. In each experiment, the power was turned off after the hold at final temperature, and cool down allowed to occur.

The resulting graphene samples were transferred for ex-situ characterization using several methods. Surface morphology and structure were analyzed by AFM (Digital Instrument Dimension 3100 Scanning probe microscopy) and low-energy-electron diffraction (LEED). Thickness of the graphene were characterized with ARPES conducted in an ultra-high vacuum chamber with base pressure $<8\times10^{-11}$ Torr with He II excitation (hv=40.8 eV) and hemispherical electron analyzer (SPECS Phoibos 150). All measurements were performed at room temperature.

Figure 3:
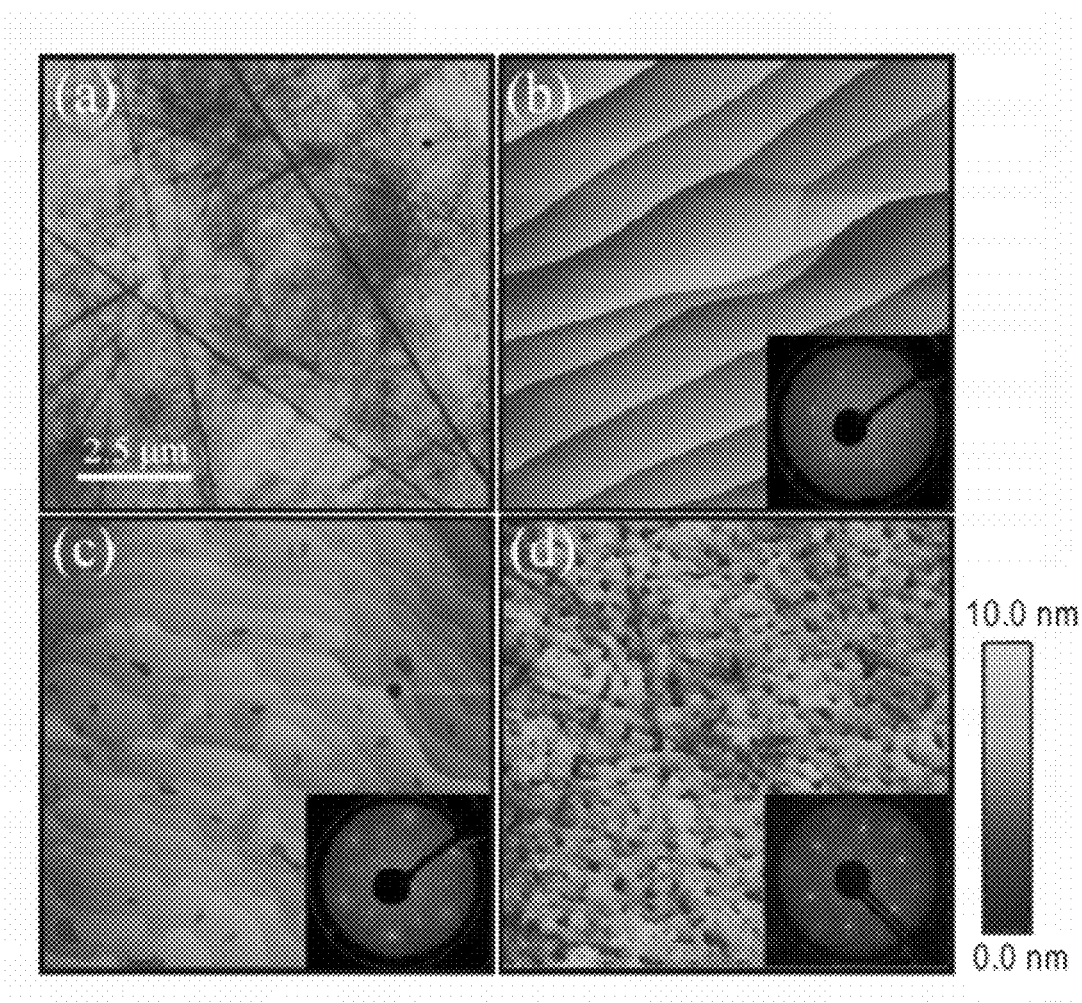
FIGS. 3 a, b, and c comprise a series of AFM images of the topographies of a SiC surface after heat treatments to various temperatures.

FIG. 3(a)-(c) show the structural evolution of samples prepared by the face-to-face method at three different temperatures measured by AFM. Panel (a) shows the morphology of the sample post annealing at 700° C. for 4 hours, and after a degassing procedure to remove any remaining chemical solutions and debris. The sample does not show any significant difference from that of untreated SiC substrate. Scratches of various depths still exist and are randomly distributed over the surface.

An AFM image of the sample annealed further at 1500° C. is presented in panel (b). It was found to be an atomically flat SiC substrate with micrometer scale terraces separated by meandering step edges, whose heights ranged from 2 nm to greater than 5 nm, depending on terrace width. This modification of the surface is not due to the formation of graphene, but it is due to the annealing of SiC described above and shown in FIG. 2. This is confirmed by LEED pattern, where only a 1×1 phase corresponding to bulk SiC is observed (inset of panel (b)). This result is similarly explained by the epitaxial growth model by thermal equilibrium [See references 19, 20]

When temperature is increased to 1530° C. and that temperature held for 20 minutes, the process changes from SiC annealing to the formation of graphene as diagrammed in "Stage II" of FIG. 2. This temperature provides the activation energy required to reorganize the extra C atoms on the surface left from Si sublimation into the graphene crystal structure. Without the reduction of the Si sublimation rate provided by the current geometry, too much Si would escape at this temperature, resulting in very thick and inhomogeneous graphene. By controlling the Si sublimation rate, precise control of the graphene growth and thickness at relatively high temperature is achieved.

FIG. 3(c) displays an AFM image and 6√3×6√3 reconstruction LEED pattern of a single-layer of graphene grown in this way. The terrace edges become less smooth compared with the SiC shown in panel (b) indicating that thermal decomposition of graphene does not necessarily follow the substrate morphology. Other characteristic features of graphene grown using the instant method are pits and curving steps. Pits have been proposed to be formed when the domains of the carbon rich surface, the precursor of graphene layers grown on SiC, pin the decomposing surface steps [21].

For comparison, single-layer graphene made by the conventional thermal decomposition method as described in detail in Ref [13] is also characterized by AFM and LEED as shown in FIG. 3(d). The density of pits and the homogeneity of single-layer graphene domains are significantly increased and decreased, respectively, compared with the sample prepared using the face-to-face method. Graphene grown with both methods show the same lattice constant as extracted from the distance between LEED spots, indicating that the different growth methods do not affect the atomic structure of graphene.

Figure 4:
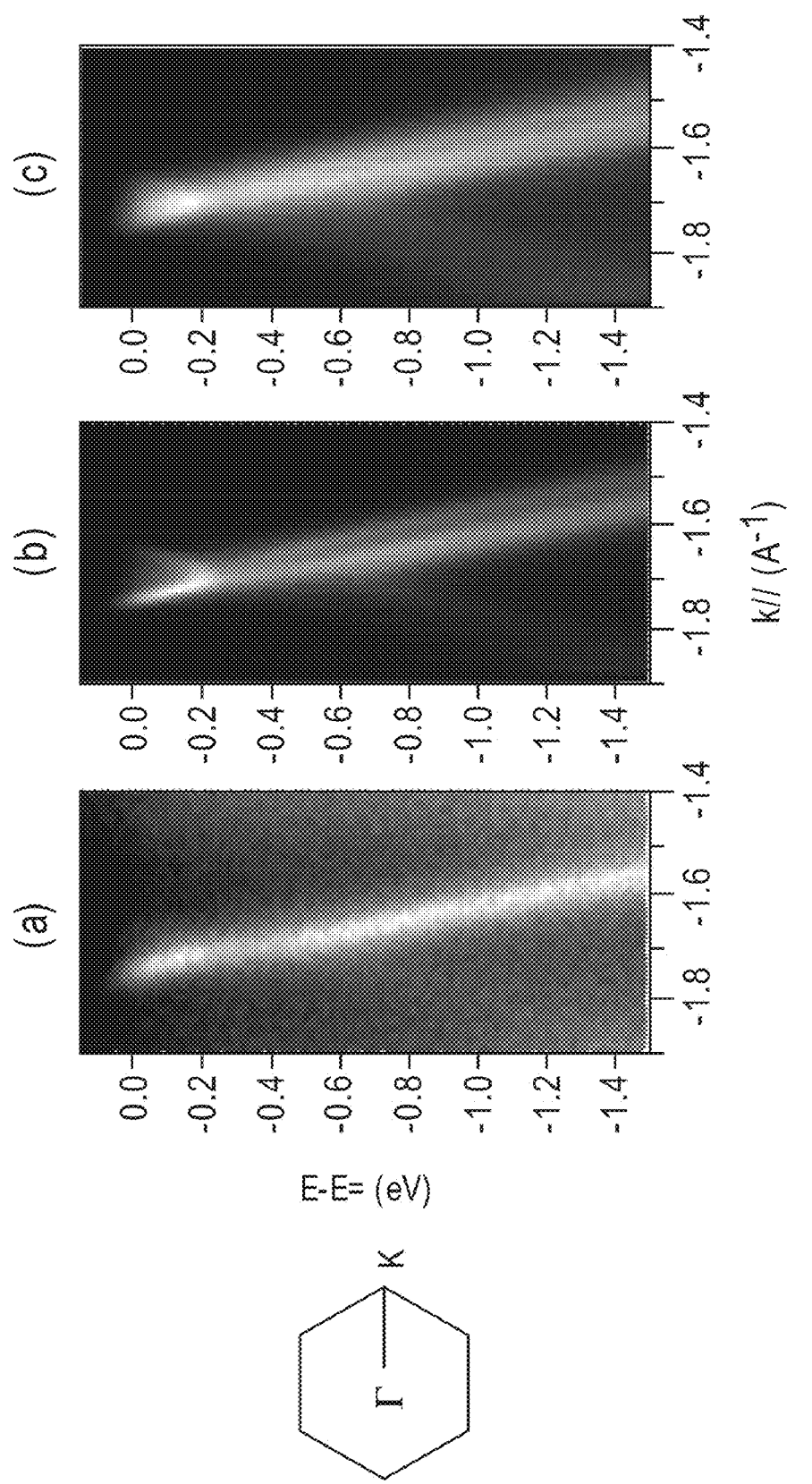
FIG. 4 depicts the band structure of (a) single-layer, (b) double-layer, and (c) triple-layer graphene epitaxially grown on 6H-SiC(0001) along the ΓK direction obtained by ARPES using He II radiation.

Direct measurements of the electronic band structure of graphene grown with the face-to-face method were performed by ARPES as shown in FIG. 4. Graphene exhibits the conical energy-momentum dispersions in which quasi-particles behave like relativistic Dirac Fermions [22]. Interference effects between photo-emitted electrons, however, hinder the observation of both sides of the conical bands along the ΓK direction, denoted by the Brillouin zone, the cartoon in FIG. 4. Instead, a single linear band (π band) is observed along this direction in single-layer graphene grown at 1530° C. as shown in panel (a), in good agreement with Ref [23]. The π band splits into two and three bands for double-layer (grown at 1600° C. (panel (b)) and triple-layer (grown at 1700° C. panel (c)), respectively, due to interlayer coupling. The thickness of graphene is also manifested by the relative position of the Dirac point. Experimental data shows that the Dirac point at $E-E_F=-0.36$ eV for single-, $-0.27$ eV for double-, and $-0.21$ eV for triple-layer graphene, which agrees well with previous results [25].

Figure 5:
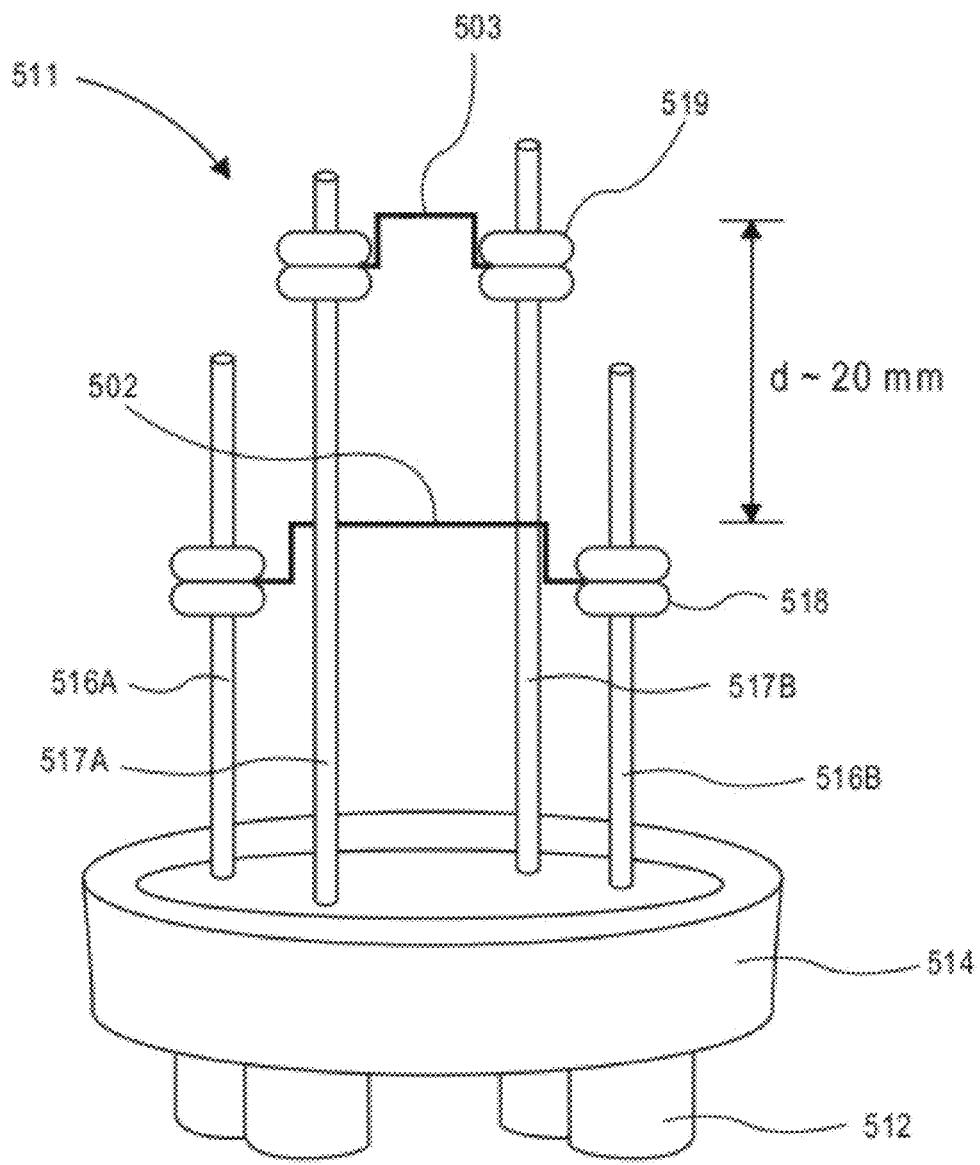
FIG. 5 depicts an alternative embodiment where a second silicon carbide substrate is replaced by a silicon substrate, the silicon substrate spaced a distance from the first silicon carbide substrate.

In another, second embodiment, illustrated in FIG. 5, an extended face-to-face approach is described in which only one SiC substrate 502 is employed, using in one embodiment the same reaction chamber as used for the first embodiment. In this second embodiment, a silicon wafer 503 is used as a silicon source, this silicon source separated from the SiC substrate by a much greater distance, e.g. up to 20 mm as illustrated in the figure, vs. the typical 0.025 mm separation described in the first embodiment. In this extended face-to-face method, silicon source 503, mounted by conductive clamps 519, is separately heated via electrodes 517A and 517B, and SiC substrate 502 mounted by conductive clamps 518 is separately heated via electrodes 516A and 516B, such that the temperatures of the SiC layer and the Si source, need not be the same. With reference to FIG. 5, other components of furnace assembly 511 include assembly base 514, insulators 512.

It is to be understood though a 20 mm spacing depicted in FIG. 5, the distance can be controlled by moving the silicon source either closer to or farther apart from the SiC substrate, such movement, however, requiring additional tuning For example, if the distance is reduced, a lower Si flux is required, which can be obtained using lower Si heating temperatures, and/or higher SiC annealing temperatures to form graphene of the same thickness. The opposite would be true if the distance were increased.

In one embodiment the spacing can be varied from a few hundred microns to as much as a few centimeters. Extended spacing, however, between the silicon source and the SiC substrate allows for other possibilities, such as for the patterning of the created graphene layers. Thus, one can create various layers of graphene in steps. By way of example, one can insert a shutter, or a sliding plate to shield certain areas of the SiC substrate for a first period of time, and then open the shutter, or move plate to expose more of the SiC substrate surface to thus in a stepwise fashion create additional graphene layers.

As a consequence of the spacing and the use of separate heating elements, using a silicon wafer as the silicon source, we were able to heat the silicon source to a lower temperature, such as 1200° C., vs. the 1500° C. temperature required for the SiC substrate, and still obtain a high flux of silicon above the SiC surface. Notably, in this embodiment, a molecular beam of silicon is generated, the molecular silicon (i.e., as singular silicon atoms), literally boiling off from the wafer. Thus, though the spacing is not critical, the silicon source must remain in the line of sight of the SiC substrate to be effective.

The first of the face-to-face methods affords no way to tune the supply of silicon, in that both of the SiC substrates, in close proximity to each other are maintained at the same temperature. With the extended range face-to-face application, two degrees of control are possible. First, the distance between the silicon source and the SiC substrate can be adjusted, the distance between the source of silicon and the SiC substrate affecting the density of the silicon flux directly above the substrate. Second, because of the distances involved, it is possible to separately heat the silicon source, such that in the first instance it can be heated to lower temperatures, such as 1200° C., the temperature thereafter either increased or decreased to either increase or decrease the silicon flux in the vicinity of the SiC surface. By this method, it is also possible to prepare just one graphene sample at a time, which may be advantageous for a given situation.

In summary, in the first of the face-to-face embodiments described herein, a new method for synthesizing micrometer scale graphene sheets by simultaneous vacuum thermal decomposition of two SiC substrates directly facing each other with only a narrow (25 micron) gap between them is described. The face-to-face geometry effectively suppresses Si sublimation: even when heated as high as 1500° C., stoichiometry of the pair of SiC substrates remains intact and annealing at this temperature results in atomically flat SiC with large terrace sizes. The onset of decomposition of SiC is delayed to unusually high annealing temperature above 1500° C. For example, at an annealing temperature higher than 1530° C., this results in the formation of very high quality, micrometer scale graphene sheets. The unique sample geometry provides a strikingly simple method for restricting the effective Si sublimation rate enabling precise control of graphene growth. By manipulating annealing temperature, the thickness of the graphene is controlled, as confirmed by ARPES or LEEM. AFM measurements demonstrate that homogeneity of graphene is notably improved by the face-to-face method compared with conventional methods. As noted before, this method is straightforward and does not require sophisticated fabrication, or elaborate specifications or additional materials for the restriction of the Si sublimation rate. Thus this method may have significant potential for the efficient production of wafer size graphene, which will be essential to develop graphene based devices.

In the second of the face-to-face embodiments described herein, that is the extended face-to-face embodiment, a second SiC surface is replaced with a silicon surface, which silicon surface is spaced a greater distance from the SiC. As a consequence of this increased spacing, the flux of silicon above the SiC wafer can be adjusted, either by changing the temperature to which the Si wafer is heated, or by adjusting the distance between the two bodies.

Optimizations of the processes described herein can be established by routine experimentation, depending upon substrate size, among other things. For example in the case of the first face-to-face embodiment, the spacing between the substrates can be varied from about 10 microns to several hundred microns to affect the aspect ratio. The temperature recipe may also be varied such as, in one embodiment, by heating the substrates in a first step to an annealing temperature of about 1500° C., holding the substrates at that anneal temperature for a predetermined but short period of time, and then raising the temperature in a second heating step to 1530° C. and above to form graphene. In the reported experiments, the heating step was continuous with the heating of the substrates to final temperatures to about 1530° C. and above (e.g. as high as 1700° C.) performed in the absence of a hold step at a first annealing temperature. Either way, such process optimization is not critical to the basic concepts of the invention, and thus does not form an important aspect thereof. For the extended face-to-face method, optimizations such as best combinations of silicon source temperature and distance from the SiC substrate may likewise be determined by routine experimentation, and are not limiting to the scope of this invention.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

REFERENCES

1. P. R. Wallace, Phys. Rev. 71, 622 (1947)
2. J. C. Slonczewski and P. R. Weiss, Phys. Rev. 109, 272 (1958)
3. K. S. Novoselov, A. K. Geim, S. V. Morozov, D. Jiang, Y. Zhang, S. V. Dubonos, I. V. Grigorieva, and A. A. Firsov, Science 306, 666 (2004)
4. K. S. Novoselov, Z. Jiang, Y. Zhang, S. V. Morozov, H. L. Stormer, U. Zeitler, J. C. Maan, G. S. Boebinger, P. Kim, and A. K. Geim, Science 315, 1379 (2007)
5. A. Bostwick, T. Ohta, T. Seyller, K. Horn, and E. Rotenberg, Nature Mater. 3, 36 (2007)
6. A. K. Geim and K. S. Novoselov, Nature Mater. 6, 183 (2007)
7. S. V. Morozov, K. S. Novoselov, M. I. Katsnelson, F. Schedin, D. C. Elias, J. A. Jaszczak, and A. K. Geim, Phys. Rev. Lett. 100, 016602 (2008)
8. K. S. Kim, Y. Zhao, H. Jang, S. Y. Lee, J. M. Kim, K. S. Kim, J.-H. Ahn, P. Kim, J.-Y. Choi, and B. H. Hong, Nature 457, 706 (2009)
9. C. Berger, Z. Song, T. Li, X. Li, A. Y. Ogbazghi, R. Feng, Z. Dai, A. N. Marchenkov, E. H. Conrad, P. N. First, and W. A. de Heer, J. Phys. Chem. B 108, 19912 (2004)
10. F. Schedin, A. K. Geim, S. V. Morozov, E. W. Hill, P. Blake, M. I. Katsnelson, K. S. Novoselov, Nature Mater. 6, 652 (2007)
11. B. Trauzettel, D. V. Bulaev, L. Loss, and G. Burkard, Nature Phys. 3, 192 (2007)
12. C. H. Lui, L. Liu, K. F. Mak, G. W. Flynn, and T. F. Heinz, Nature 462, 339 (2009)
13. E. Rollings, G.-H. Gweon, S. Y. Zhou, B. S. Mun, J. L. McChesney, B. S. Hussain, A. V. Fedorov, P. N. First, W. A. de Heer, A. Lanzara, J. Phys. Chem. Solids 67, 2172 (2006)
14. R. M. Tromp and J. B. Hannon, Phys. Rev. Lett. 102, 106104 (2009)
15. M. Hupalo, E. H. Conrad, and M. C. Tringides, Phys. Rev. B 80, 041401(R)(2009)
16. K. V. Emtsev, A. Bostwick, K. Horn, J. Jobst, G. L. Kellogg, L. Ley, J. L McChesney, T. Ohta, S. A. Reshanov, J. Röhrl. E. Rotenberg, A. K. Schmid, D. Waldmann, H. B. Weber and T. Seyller, Nature Mater. 8, 203 (2009)
17. C. Virojanadara, M. Syaäjarvi, R. Yahimova, L. I. Johansson, A. A. Zakharov and T. Balasubramanian, Phys. Rev. B 78, 245403 (2008)

18. D. A. Siegel, S. Y. Zhou, F. El Gabaly, A. V. Fedorov, A. K. Schmid, and A. Lanzara, Appl. Phys. Lett. 93, 243119 (2008)
19. M. Syväjärvi, R. Yakimova, M. Tuominen, A. Kakanakova-Georgieva, M. F. MacMillan, A. Henry, Q. Wahab, E. Janzén, J. Crystal Growth 197, 155 (1999)
20. M. Syväjärvi, R. Yakimova, E. Janzén, J. Phys.: Condens. Matter 11, 10019 (1999)
21. J. B. Hannon and R. M. Tromp, Phys. Rev. B 77, 242404 (R)(2008)
22. K. S. Novoselov, A. K. Geim, S. V. Morozov, D. Jiang, M. I. Katsnelson, I. V. Grigorieva, S. V. Dubonos, A. A. Firsov, Nature 438, 197 (2005)
23. T. Ohta, A. Bostwick, J. L. McChesney, T. Seyller, K. Horn, and E. Rotenberg, Phys. Rev. Lett. 98, 206802 (2007)
24. A. Damascelli, Z. Hussain, and Z.-X. Shen, Rev. Mod. Phys. 75, 473 (2003)
25. S. Y. Zhou, G.-H. Gweon, A. V. Fedorov, P. N. First, W. A. De Heer, D.-H. Lee, F. Guinea, A. H. Csatro Neto and A. Lanzara, Nature materials 6, 770 (2007)

We claim:

1. A method for the production of graphene comprising:
   spacing a silicon wafer from a silicon carbide wafer in a pressure vessel;
   reducing the pressure in the vessel to vacuum;
   heating the silicon wafer to a first temperature to evaporate silicon from its opposing surface;
   while simultaneously, heating the silicon carbide wafer to a second temperature to anneal the silicon carbide wafer,
   wherein the first temperature is 1200° C. and the second temperature is about 1500° C. and above.
2. The method of claim 1 wherein the spacing between the silicon wafer and the silicon carbide wafer is expanded.
3. The method of claim 2 wherein the spacing between the silicon wafer and the silicon carbide wafer is in the order of a few hundred microns to a few centimeters.
4. The method of claim 3 wherein the spacing between the silicon wafer and the silicon carbide wafer is in the order of 20 mm.
5. A method for the production of graphene comprising:
   spacing a silicon wafer from a silicon carbide wafer in a pressure vessel;
   reducing the pressure in the vessel to vacuum;
   heating the silicon wafer to a first temperature to evaporate silicon from its opposing surface;
   while simultaneously, heating the silicon carbide wafer to a second temperature to anneal the silicon carbide wafer,
   wherein following anneal, the silicon carbide wafer is heated above said second annealing temperature to a higher temperature to form graphene,
   wherein the higher temperature is around 1530° C.
6. A method for the production of graphene comprising:
   spacing a silicon wafer from a silicon carbide wafer in a pressure vessel:
   reducing the pressure in the vessel to vacuum;
   heating the silicon wafer to a first temperature to evaporate silicon from its opposing surface;
   while simultaneously, heating the silicon carbide wafer to a second temperature to anneal the silicon carbide wafer,
   wherein the silicon wafer is a second silicon carbide wafer,
   wherein said first and second temperatures are the same.
7. The method of claim 6 wherein the silicon carbide wafer is held at a final temperature for about 20 minutes.
8. The method of claim 7 wherein the final temperature is about 1600° C.
9. The method of claim 7 wherein the final temperature is about 1700° C.

* * * * *